United States Patent [19]

Sansom

[11] Patent Number: 4,738,510
[45] Date of Patent: Apr. 19, 1988

[54] FIBER OPTIC DISPLAY DEVICE AND METHOD FOR PRODUCING IMAGES FOR SAME

[76] Inventor: William L. Sansom, 317 St. Pauls Ave., Jersey City, N.J. 07306

[21] Appl. No.: 717,004

[22] Filed: Mar. 28, 1985

[51] Int. Cl.⁴ .......................... G02B 6/06; F21V 7/04; G09F 13/00; G03B 27/00

[52] U.S. Cl. .............................. 350/96.25; 350/96.24; 350/96.10; 350/320; 350/96.27; 362/32; 40/427; 40/547; 355/1

[58] Field of Search ................. 355/1; 362/32; 40/547, 40/427, 438; 250/227; 350/96.10, 96.24, 96.25, 96.27, 96.29, 320

[56] References Cited

U.S. PATENT DOCUMENTS

| | | | |
|---|---|---|---|
| 2,982,175 | 5/1961 | Eisler | 350/96.24 |
| 3,202,045 | 8/1965 | Arsenault et al. | 350/96.24 |
| 3,489,482 | 1/1970 | Brill | 350/96.10 |
| 3,560,085 | 2/1971 | Silverberg . | |
| 3,781,109 | 12/1973 | Mayer, Jr. et al. | 355/52 |
| 3,815,986 | 6/1974 | Darbee | 355/1 |
| 3,836,911 | 9/1974 | Gibson et al. | 350/96.24 |
| 3,909,109 | 9/1975 | Aurenz | 350/96.24 |
| 3,914,877 | 10/1975 | Hines | 380/54 |
| 4,057,338 | 11/1977 | Yevick | 350/96.24 |
| 4,185,888 | 1/1980 | Quelle, Jr. | 350/96.25 |
| 4,223,343 | 9/1980 | Belmares-Sarabia et al. | 358/54 |
| 4,290,688 | 9/1981 | Call | 355/1 |
| 4,352,550 | 10/1982 | Uchida | 355/3 R |
| 4,570,063 | 2/1986 | De Bie et al. | 250/227 |
| 4,613,210 | 9/1986 | Pollard | 350/96.25 X |

FOREIGN PATENT DOCUMENTS 56-83705 7/1981 Japan .................. 350/96.24

Primary Examiner—William L. Sikes
Assistant Examiner—Brian M. Healy

[57] ABSTRACT

A fibre optic display device utilizing optical fiber elements whose light emitting ends are arranged in a display screen matrix and whose light-receiving ends are reorganized and gathered in a bundle in a non-linear image-receiving matrix. A defined image previously encoded on a transparency is caused to appear on the display screen by being specifically decoded when the transparency is in registration with the light-receiving ends of the bundle in the image receiving matrix. Moving the encoded image into and out of registration causes the transparency to produce special effects on the display screen.

14 Claims, 3 Drawing Sheets

FIBER OPTIC DISPLAY DEVICE AND METHOD FOR PRODUCING IMAGES FOR SAME

This invention relates to a fiber optic display device for projecting through a display screen programmed defined and undefined images, and which is also capable of producing special visual effects which herebefore could be achieved only by electronic and/or complex photographic techniques.

BACKGROUND OF THE INVENTION

It has been recognized in the field of optical displays that a coherent bundle to matrix arrangement of optical fibers produces an ideal medium for pictorial display.

By "coherent bundle to matrix arrangement" is meant that each optical fiber exposed to a source of light and an image for projection through a "projection matrix" it is connected to a display screen at a point corresponding to the respective fiber exposed to the image and light source, thereby to duplicate the image on the display screen matrix face. Generally, the fiber points in the display screen matrix face are more widely spaced from one another than are the corresponding fiber points at the light source and image-receiving matrix for the purpose of magnification of the image.

This, however, results merely in a display of a picture or indicia or a succession of same, without any other graphic variety, such as special color, brightness and other visual effects to hold viewer interest between such displays. Thus, coherent bundle displays are not widely used, particularly since motion pictures and slide projectors accomplish the same result and any desired magnification.

Although motion picture and video equipment, ranging from computer controlled light boards to television displays, will produce such special effects, their expense makes such alternative devices noncompetitive with optical fiber display devices. In addition, while a simple belt mechanism will provide low cost imaging on a coherent matrix, its readily apparent mechanical predictability is not sufficient to hold viewer interest. It is toward the solution of these problems that the present invention is directed.

The concept of a coherent bundle to matrix arrangement may best be visualized by the following:

If one were to number and mark each fiber point on a matrix display face, the fiber that leads back through the bundle to the image-receiving end must be located in the exact same location on the end of the image-receiving end of the bundle with respect to the display screen matrix.

In any lengthwise grouping of fibers each light-receiving end of an optical fiber and a corresponding light emitting face thereof will result in point correspondence between the faces to form a minor image relationship when viewed from the display end.

If one imagines a stack of 20 logs arranged to form 4 layered rows of 5 logs each and one faces one end of the stack and counts three rows down second log in, its corresponding end at the other face is third row down, 4th log in. This is the way coherent bundles of optical fibers are arranged. Differing arrangements are known as non-coherent or reorganized fiber arrangements and constitute the basis of the fiber organization for this invention.

While coherent bundles are still used in optical fiber display devices, the devices are generally costly to fabricate by known techniques due to the necessity of connecting each end of an image receiving fiber to the corresponding end of an image-projecting fiber in the same spacial relationship which heretofore has been accomplished manually.

Moreover, no unusual display "special effects" are accomplished in this manner, such as dramatic variations in color, fade-in and fade-out, wipe-in and wipe-out, exploded images and imploded images, variations in brilliance, and the like, all of which can be accomplished by using non-coherent or reorganized fibers in accordance with the present invention.

Accordingly, it is a principal object accomplished by the present invention to provide a relatively low cost optical fiber display device and method for producing images for same which overcomes the aforesaid difficiences of the prior art, and at the same time facilitates intermittent defined image projection and "special effects" in the same device.

SUMMARY OF THE INVENTION

The device of this invention is composed of a plurality of optical fiber elements. Their light emitting ends are placed in a predetermined pattern, ideally in an overall rectangular or square shape forming a display screen matrix, as known in the art. The substrate of the display screen matrix in which the optical fibers are fixed may be material commonly used in the display arts, the overall appearance of the face of the display screen being generally that of a movie or TV screen.

In a preferred embodiment, the fibers are gathered at their light receiving ends into a bundle forming an image-receiving matrix face, which bundle is non-coherent with respect to the display screen matrix. The bundle is connected to a mechanism composed of an encoded image belt, a registration device and a light source for projection of images.

To produce a defined image for display through non-coherent optical fibers, one must encode the bundle of fibers for that purpose. This is accomplished by reverse projection of the desired image onto the display screen matrix face or a cross-section of the bundle of non-coherent optical fibers. This image will travel in reverse through the various paths of the reorganized or non-coherent fiber bundle to emerge as an apparently scrambled image at the other ends of the fibers, that is, the normally image-receiving ends of the matrix exposed to a light source. The resulting image is photographed and processed to produce a transparency. When the transparency is once again placed at the normally light-receiving end of the bundle (the image-receiving matrix face) and each photographed fiber point is matched with the original fiber that produced that point on the transparency, it is in registration. Shining a light source through the so registered transparency will send the encoded image back through the non-coherent fibers to the display screen matrix, thereby decoding the image and producing once again the original defined image on the display screen face.

If the encoded defined image is held against the fiber bundle at the light source or image-receiving matrix face, but not in the original photographed position, (that is, out of registration) it will produce a scrambled image on the display screen face. Thus when the transparency or encoded image is moved out of registration it produces a variety of unusual color and motion effects on the display face. When another encoded image is brought into registration, the next defined image is decoded and suddenly snaps into view on the display face.

In another embodiment the optical fibers in the display screen matrix are divided into sections or quadrants and preselected quadrants or individual fibers are reorganized at the image-receiving matrix face to provide for special effects, such as fade-in and fade-out, wipe-in and wipe-out, exploded and imploded images and the like.

In this case the fibers in the bundle are reorganized in a precise orderly fashion, each section or quadrant of the fibers in the display screen matrix being connected in a coherent manner to a preselected portion of the image-receiving matrix face to achieve the desired visual effect. It is important to note in this connection that there is a distinct difference between "non-coherent" bundles of fibers, which are randomly oriented, and "reorganized" fiber bundles which are groups of "coherent" fibers.

In the context of this specification and claims, "reorganized fibers" is intended to embrace and include non-coherent bundles of fibers and parts of bundles which are reorganized but may be coherent in part.

In producing defined images and "special effects" with reorganized fibers, the same procedure is used as outlined above with respect to non-coherent fibers. That is, the defined image is projected in reverse onto a display screen or the equivalent and photographed at the normally light-receiving ends of the normally image-receiving matrix to produce a transparency. Movement of the so-produced transparency before the projection matrix during normal projection will then produce the desired special effect.

BRIEF DESCRIPTION OF THE DRAWINGS

The invention will best be understood by the following drawings and the description with respect thereto, wherein:

Referring to FIG. 1 there is a schematically shown a housing 2 provided with an optical fiber display screen 4, the outer viewing face of which comprises a multiplicity of light emitting optical fiber ends 6, or fiber-points, bonded together in a matrix to form the display screen.

Figure 1:
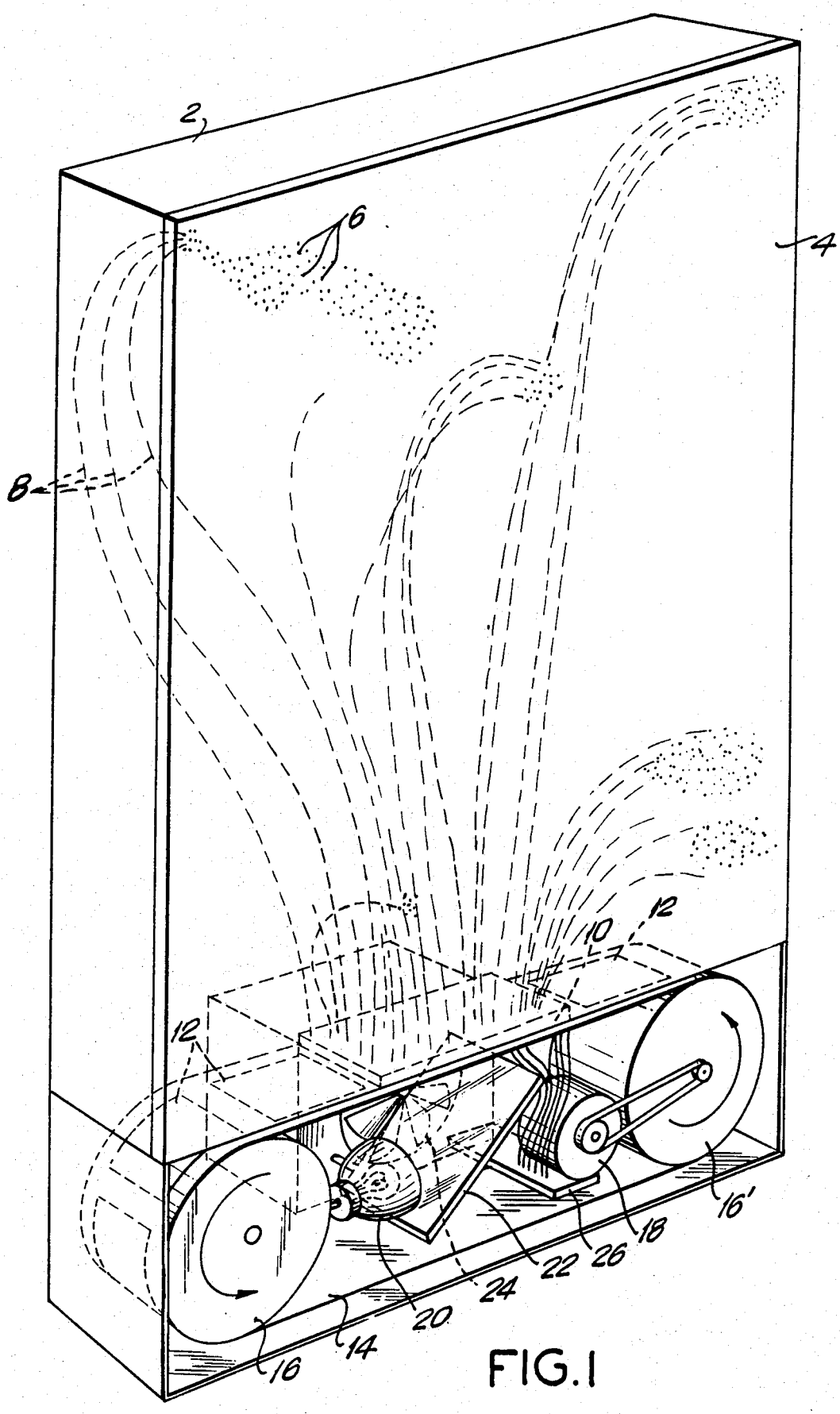
FIG. 1 is a schematic view of an optical fiber display device in accordance with the present invention.

Each fiber point is represented by an optical fiber generally indicated as 8 forming a bundle of fibers extending from the normally light emitting ends 6 to a normally image-receiving matrix 10, also provided with fiber points terminating beneath the matrix (not shown) to receive light and/or encoded images or other information projected therethrough.

Encoded images are projected from beneath image-receiving matrix 10 through a series of transparencies 12 carried by a continuous belt 14. These transparencies may be spacially separated on belt 14, as shown, or may together form the belt itself. Belt 14 is mounted on two rotatable spindles 16 and 16' and driven by drive means 18, such as an electric motor, as known in the art.

Beneath belt 14, there is provided a source of light 20 which impinges on an angularly disposed dichroic mirror 22 to reflect light to the bottom of the transparencies 12 carried by belt 14 and to filter out infra-red light components. A fan 25 is provided to remove heat generated by light source 20.

It is important to provide control means for assuring that the encoded transparencies are accurately registered with the light-receiving optical matrix 10 to produce the desired decoded display on screen 4. Such control means is generally shown at 26 in FIG. 1, and more specifically in FIG. 2, also in schematic form.

Figure 2:
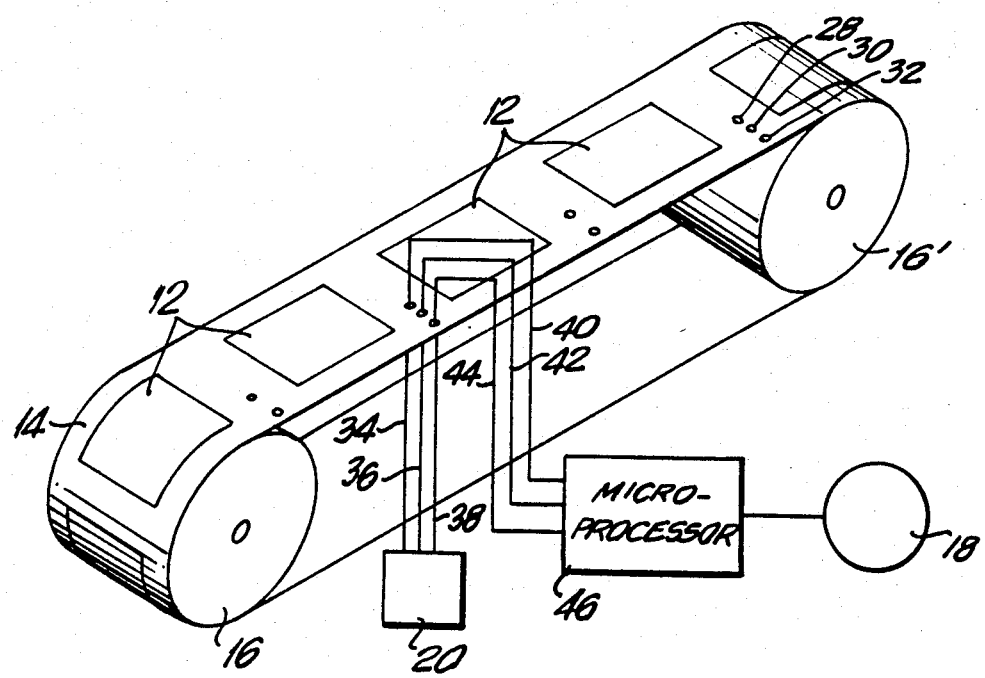
FIG. 2 is a schematic view of an electrical system for controlling the operation of the device of FIG. 1.

FIG. 2 shows the belt 14 provided with a series of transparent areas 28, 30 and 32 respectively, for controlling, for example, stop, start and speed. Whether any particular one of these areas will appear will depend upon the programmed sequence of the display desired. Each area is disposed to register with a source of light 20 which may be the same as used in the display device of FIG. 1, such light being directed to such areas through optical fibers 34, 36 and 38 beneath belt 14. Further optical fibers 40, 42 and 44 are disposed in registration with optical fibers 34, 36 and 38, respectively to direct corresponding signals to a microprocessor 46 or suitable control means as known in the art. The microprocessor may be provided with photo diodes to detect the corresponding light signals transmitted, or photo diodes may be disposed adjacent belt 14 to detect such signals and transmit the same to the microprocessor.

Figure 3:
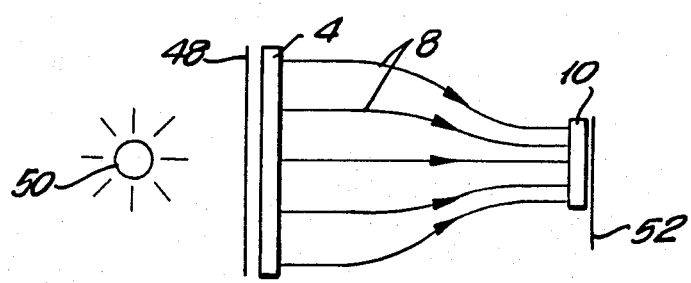
FIG. 3 is a schematic view of a device for forming transparencies of defined images to be projected through the device of FIGS. 1 and 2.

FIG. 3 illustrates a method of encoding defined images for producing encoded transparencies 12 (FIGS. 1, 2) by reverse projection of the desired images through the device of FIG. 1 or a part thereof. A transparency 48 provided with a desired image is placed between a source of light 50 and the outer face of display screen 4 and the image is projected through the bundle of fibers 8 to the normal image-receiving matrix 10 and photographed on a film 52 to produce an encoded transparency 12 to be used as in FIG. 1.

The invention, as indicated above, provides a means for projection of defined images onto an optical fiber display screen in combination with "special effects" which are presented between such displays. These "special effects" are in some instances achieved when the defined image is out of registration with the optical fibers, thereby causing a scrambled image on the screen, but enabling a multitude of color and other visual effects to hold viewer interest.

To augment the "special effects", the optical fibers are reorganized between the display screen and the normally image-receiving ends of the fibers and the source of light. By "reorganized" it is meant, in one exemplary sense, that the optical fibers are so arranged that they are divided into quadrants of coherent sections which are made to produce "special effects" by the manner in which they are disposed at the light receiving ends thereof with respect to the display screen.

For example, by reorganizing the optical fibers at the light receiving ends thereof with respect to the display screen, it is possible to produce an exploded image or an imploded image, a wipe-in or a wipe-out of an image or a fade-in and fade-out of a defined image by selectively reorientating the fibers.

This is accomplished by dividing the display screen into preselected areas shown only for illustrative purposes as quadrants and by selectively reorienting the fibers of each quadrant to affix the same to the matrix bonding the normally image-receiving ends thereof in such relationship as to achieve the desired special effects.

The foregoing is more specifically illustrated in FIGS. 4–7, wherein the image-receiving ends of the optical fibers are so disposed on the light-receiving projection matrix as to receive progressive images or information from belt 14 as it passes beneath the light-receiving ends of the fibers. By programmed reorganization of the light receiving ends of the optical fibers with respect to selective quadrants of the display matrix, it is possible to cause the display to achieve different visual effects as described above, prior to or after a defined image on a transparency 12 is registered with the optical fibers at the image-receiving ends of the fibers.

Figure 5:
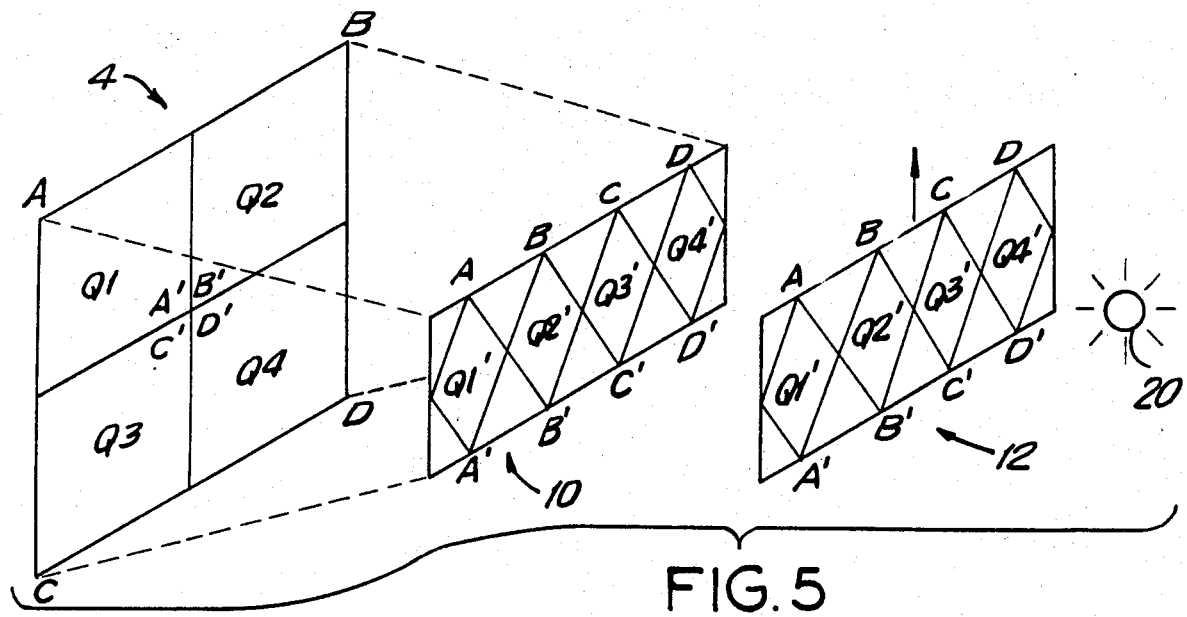
FIG. 5 is a schematic view of an optical fiber display system for producing "special effects", namely an explosion from the center of a display screen.
Figure 6:
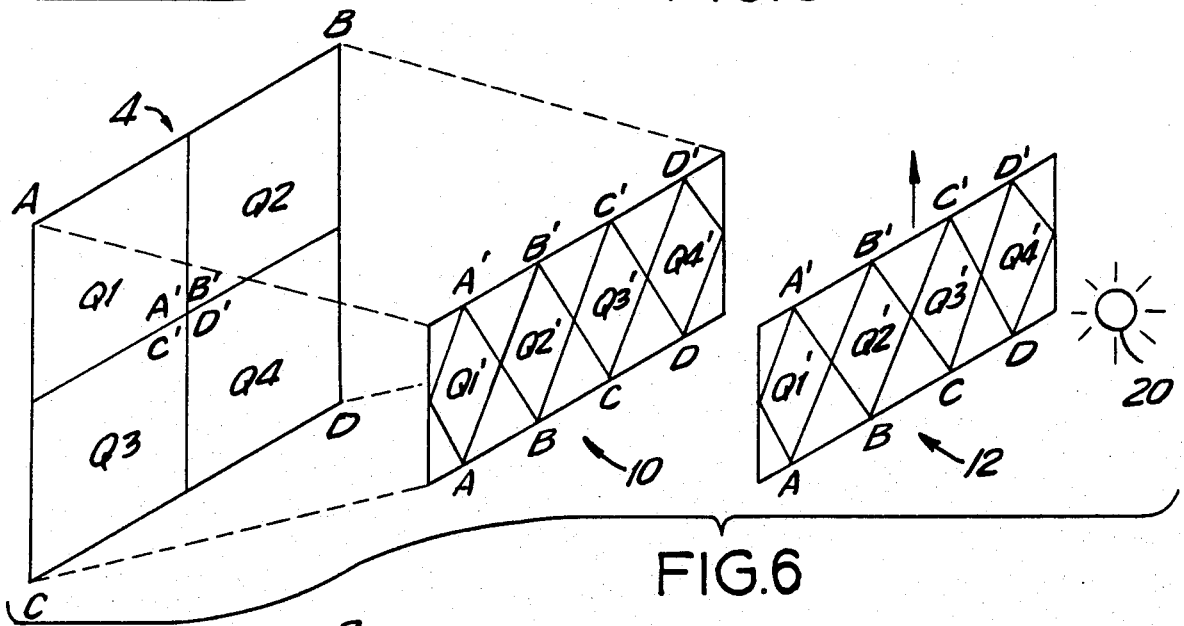
FIG. 6 is a schematic view of an optical fiber display system for producing an implosion from the corners of a display screen.
Figure 7:
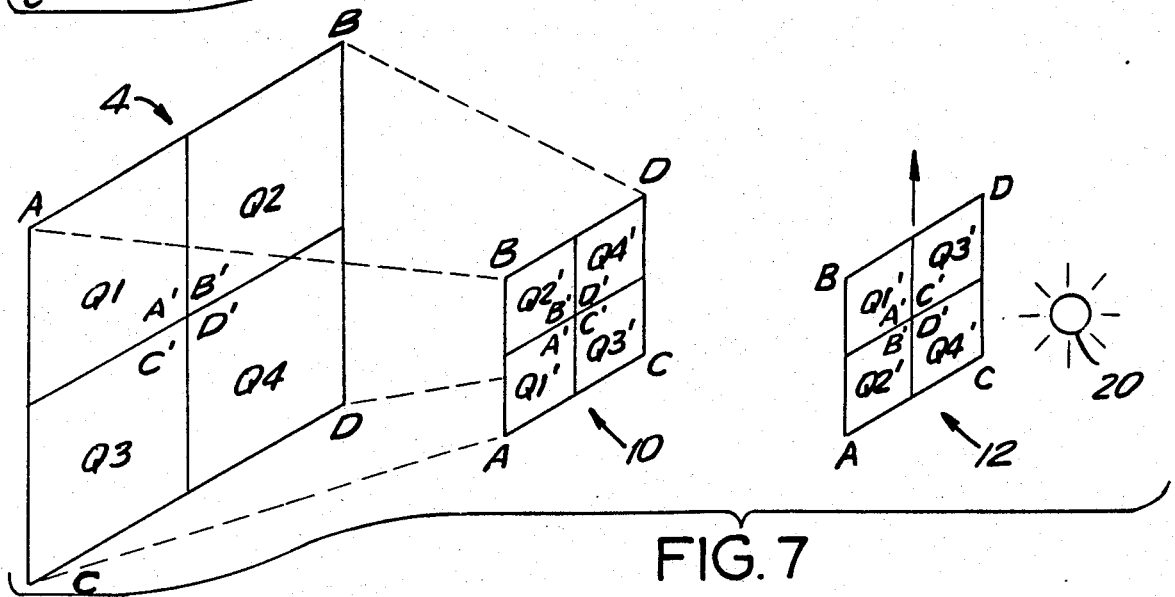
FIG. 7 is a schematic view of an optical fiber display system for producing a "wipe-in" of a defined image on a display screen.

For purpose of illustrating how certain "special effects" can be achieved, but in no way limiting the multitude of possibilities of doing so, FIGS. 4–7 show in a simplistic and schematic manner various arrangements of reorganized fibers in coherent bundles to produce, respectively, an explosion of a defined image from the center of the display screen 4 (FIG. 5); at implosion of a defined image from the corners of the display screen 4 (FIG. 6); and a wipe-in of a defined image from the left of the inside of display screen 4 (from the right of screen 4 as viewed from the outside thereof), as shown in FIG. 7.

As exemplified in FIGS. 4–7, the display screen 4 is divided into four quadrants, designated as Q1, Q2, Q3 and Q4, respectively, (viewed from the inside). The outside corners of display screen 4 (also viewed from the inside) are designated by corners A,B,C and D as shown. The intersection of each quadrant at the center of display screen 4 is designated by A', B', C' and D', also as illustrated.

To produce the above described and other special effects, the optical fibers from each quadrant Q1–Q4 are reorganized and affixed in a coherent manner in the image-receiving matrix 10. When a transparency is made, as described above, in a reverse direction from normal image projection, the transparency will be in conformity with the encoded image projected through the reorganized fibers.

Figure 4:
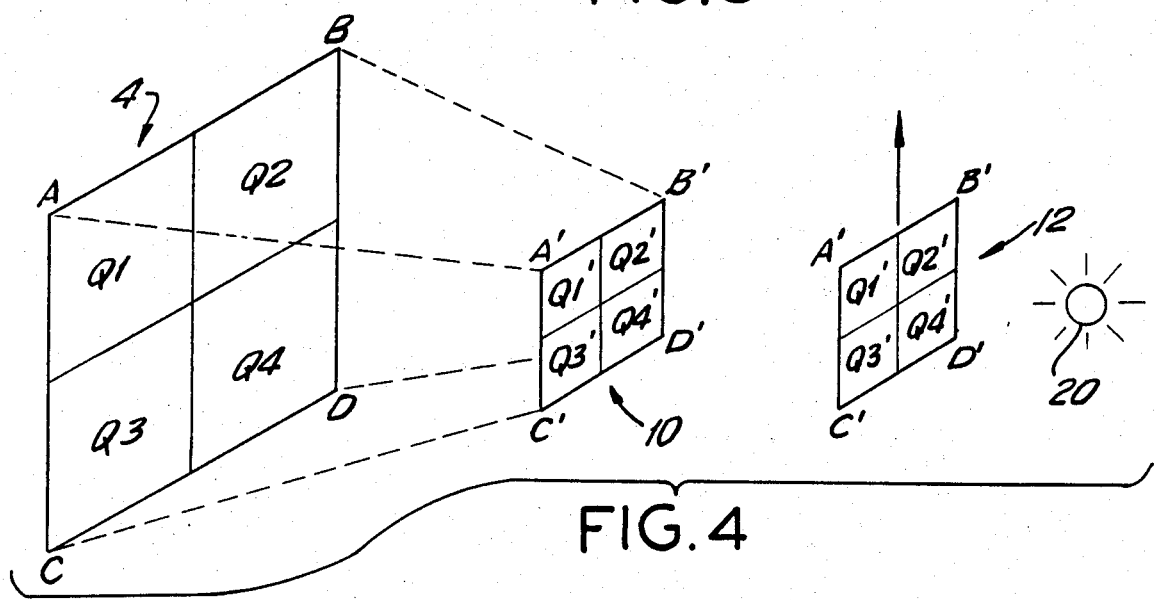
FIG. 4 is a schematic view of an optical fiber display system showing use of coherent bundles of fibers for illustrative purposes.

FIG. 4 is presented only to better understand the invention and illustrates schematically a system wherein the display screen 4 is divided into four quadrants Q1–Q4 defined by corners A–D and the fibers from each quadrant are coherently arranged in projection matrix 10 in corresponding quadrants Q1'–Q4' defined by corners A'–D'. When an encoded transparency 12 of an image is passed between projection matrix 10 and a source of light 20, in the direction of the arrow shown in FIG. 4, an image will appear on display screen 4 when all quadrants of the transparency 12 and of image-receiving matrix 10 are in registration. This illustrates a completely coherent optical fiber display system which is described only for the purpose of enabling a better understanding of the present invention, as indicated above.

FIG. 5 shows schematically how, by reorganization of coherent bundles of fibers, an explosive view of a defined image can be produced from the center of display screen 4. To accomplish this, the fibers from the respective quadrants of the display screen 4 are reorganized and disposed in the projection matrix 10 as shown, each point of the quadrants Q1–Q4 of the display screen being reorganized as quadrants Q1'–Q4' of image-receiving matrix 10, so that points A,B,C and D and A',B',C' and D' are as indicated in the image-receiving matrix 10 of FIG. 5. Then, when a photographed transparency 12 is made in reverse direction, the transparency will correspond to the encoded image transmitted through the image-receiving matrix 10.

When transparency 12 is moved upward in FIG. 5, as indicated by the arrow, and during normal projection of the defined image, the points A',B',C' and D' on the transparency 12 will first register with the corresponding points A'–D' on the image-receiving matrix 10. These points A',B',C' and D' by virtue of corresponding also to the center of display screen 4, will start to register the image from transparency 12 and display the same from the center of display screen 4 as the transparency 12 progresses upwardly past light source 20, until the complete image on the transparency forms up on display screen 4.

In a similar manner, an implosion of a defined image from the outer corners A–D of the display screen 4 can be accomplished as shown in FIG. 6. In this case the optical fiber bundles of the respective quadrants Q1–Q4 are so reorganized that the outermost points A,B,C,D of respective quadrants Q1–Q4 appear on the lower part of image-receiving matrix 10 and the upper part of transparency 12; and the innermost points A',B',C' and D' of the quadrants of display screen 4 appear at corresponding points of image-receiving matrix 10 and transparency 12, as shown in FIG. 6.

When transparency 12 is moved upwardly in the direction of the arrow in FIG. 6, points A–D of transparency 12 start to register with corresponding points A–D on image-receiving matrix 10 from the outside corners A–D and result in a completely defined image when the transparency 12 and the image-receiving matrix 10 are in registration.

If it is desired to provide a "wipe-in" or a "wipe-out" special effect, this can be accomplished by reorganizing the fibers as shown in FIG. 7. In this figure a "wipe-in" is illustrated from left to right of the inside of display screen 4 (right to left as viewed from the outside of the display screen).

Here, the fibers are so reorganized that when transparency 12 moves upwardly between light source 20 and the image-receiving matrix 10, the defined image starts to form up on the left (inside) of display screen 4 and continues across the screen to the right (inside) thereof until the transparency 12 is in complete registration with image-receiving matrix 10, at which time the complete image is displayed.

In a similar manner a "wipe-out" may be accomplished simply by reversing the fiber reorganization, as will be apparent from the foregoing description.

If it is desired to "fade-in" or "fade-out" an image, this can be accomplished by reorganizing the normal light-receiving ends of the fiber bundle over the entire face of the projection matrix 10, so that any light obstruction passing between light source 20 and projection matrix 10 will gradually dim the image on display screen 4 until it fades out or causes the display screen to brighten from no image until the image fades in. This is not possible when using an entirely coherent bundle of fibers, as illustrated in FIG. 4, wherein an image obstruction passing between the light source 20 and projection matrix 10 will simply result in a dark area passing across display screen 4.

More specifically, the reorganization of the fibers to produce such a "fade-in" or "fade-out" is done in such manner that in each row of the light-receiving ends of the fibers there are located some fibers that correspond to various preselected sections over the display screen. Consequently, as a dark portion of the film moves in a linear way across the light-receiving fiber matrix it progressively blocks out a greater part of each section of the display screen matrix until the image fades out. The fadeing-in of an image is accomplished in a similar, but reverse manner.

The foregoing description of the manner in which "special effects" can be provided in accordance with this invention is only illustrative of the multitude of reorganized fiber arrays which can be made to accomplish the objects of this invention.

It should also be understood that resort may be had to such modifications and equivalents as fall within the spirit of the invention and the scope of the claims hereinafter made.

What is claimed is:

1. A fiber optic display device for creating optical wipes by projecting on a display screen programmed defined immobile images and undefined images comprising:
   a display screen matrix and an image-receiving matrix;
   a plurality of optical fibers forming a bundle of fibers connected to and between and display screen matrix and said image-receiving matrix, one end of said bundle of fibers being arranged in a two-dimensional array in said display screen matrix and the other end thereof being arranged in a two-dimensional array in said image-receiving matrix, the fiber ends in said image-receiving matrix being reorganized with respect to the fiber ends in said display screen matrix in non-linear fashion and reorganized such that the respective ends of said fibers occupy different relative positions at said image-receiving matrix and said display screen matrix ends and being appropriately rearranged such that images received by said image-receiving matrix are simultaneously displayed over preselected areas of said display screen matrix when an image is in partial registration with said image-receiving matrix in a manner which can produce a recognizable variation of a true image prior to complete registration between said image and said image receiving matrix fibers and encoded images are decoded and simultaneously displayed as true images over the entire display screen matrix when an immobile encoded image is in complete registration with said image-receiving matrix so that said optical fibers are reorganized to produce optical wipes as an image moves from partial to complete registration with said image-receiving matrix fibers, said display screen being divided into distinct areas and each such distinct area having at least one optical fiber connected thereto with said at least one optical fiber having the other end thereof located in the image-receiving matrix;
   means to project a light-generated encoded image onto said image-receiving matrix; and
   a plurality of encoded transparencies mounted on a movable means, means for moving said movable means; each encoded transparency having an image thereon which is reorganized in correspondence with said screen distinct areas such that as said encoded transparency is moved in front of said image-receiving matrix the image formed on said display screen is initially a variation of the true image which can be a recognizable variation of the true image, and then said variation image becomes the true image as said encoded transparency moves into complete registration with said image-receiving matrix whereby to create optical wipes as said transparency moves into complete registration from a non-registration position.

2. A device according to claim 1 wherein said means to project a light-generated encoded image onto said image-receiving matrix comprises a rotatable belt provided with photographic transparencies of said encoded defined images, and means to register said images with the image-receiving ends of said optical fiber bundle, and light means to project said transparencies onto said image-receiving matrix.

3. A device according to claim 1, wherin said means to project light-generated images onto said image-receiving matrix comprises a rotatable belt provided with photographic transparencies of encoded defined images and undefined images, and means to register successively said encoded defined and undefined images with the image-receiving ends of said optical fiber bundle to produce defined and undefined images on said display screen matrix, and light means to project light-generated images onto said image-receiving matrix.

4. A device according to claim 2, wherein said rotatable belt is connected to drive means actuated by control means for intermittently stopping said belt to register a transparency of a preselected defined image with said image-receiving matrix.

5. A device according to claim 3, wherein said rotatable belt is connected to drive means actuated by control means for intermittently stopping said belt to register a transparency of a preselected defined image with said image-receiving matrix.

6. A fiber optic display device according to claim 1, wherein said encoded defined images are produced by reversely projecting a primary image onto the face of said display screen matrix and through reorganized fibers in a normally image-receiving matrix, and photographing the same to produce an encoded transparency of said image, whereby said light-generated encoded image directed onto said normally image-receiving matrix corresponds to the image on the transparency so produced.

7. A fiber optic display device according to claim 1, wherein said encoded defined images are produced by reversely projecting a primary image onto the face of said display screen matrix and through reorganized fibers in a normally image-receiving matrix, and photographing the same to produce an encoded transparency of said image, whereby said light-generated encoded image directed onto said normally image-receiving matrix corresponds to the image on the transparency so produced.

8. A device according to claim 1, wherein said encoded image is projected onto said image-receiving matrix by means for linearly moving, in sequence, successive images provided by photographic tranparencies of said encoded images.

9. A method of generating optical wipes using a fiber optic display device comprising:

providing a two-dimensional display screen matrix and a two-dimensional image-receiving matrix;

dividing the display screen matrix into a plurality of separate areas;

providing a plurality of optical fibers forming a bundle of fibers connected to and between said display screen matrix and said image-receiving matrix;

arranging first ends of said fibers in a two-dimensional array in said display screen matrix and the other ends of said fibers in a two-dimensional array is said image-receiving matrix;

reorganizing the fiber ends in said image-receiving array with respect to the fiber ends in said display screen array in non-linear fashion such that the respective ends of said fibers occupy different relative positions in said image-receiving array and in said display screen array and said fibers are appropriately rearranged such that images received by said image-receiving matrix are simultaneously displayed over pre-selected areas of said display screen matrix when an image is in partial registration with said image-receiving matrix in a manner which can produce a recognizable variation of a true image prior to complete registration between said image and said image-receiving matrix fiber ends and encoded images are decoded and simultaneously displayed as a true image over the entire display screen matrix when an immobile encoded image is in complete registration with said image-receiving matrix so that said optical fibers are reorganized and can produce optical wipes as an image moves from partial registration to complete registration with said image-receiving matrix fiber ends;

connecting one end of at least one fiber of the bundle of fibers to each area of the display screen matrix with the other end of said one fiber being located in the image-receiving matrix;

preparing a plurality of transparencies, each having an image thereon which is organized in correspondence with the various areas of said display screen matrix such that as said encoded transparency is moved in front of said image-receiving matrix the image formed on said display screen can initially be a recognizable variation of the true image, and then said variation image can become the true image as said encoded transparency moves into complete registration with said image-receiving matrix to create optical wipes as said transparency moves into complete registration from a non-registration position;

moving each encoded transparency in front of the image-receiving matrix; and projecting said encoded transparency onto said image-receiving matrix.

10. The method defined in claim 9 wherein the optical wipes includes a fade-in and a fade-out.

11. The method defined in claim 9 wherein the optical wipes includes a wipe-in and a wipe-out.

12. The method defined in claim 9 wherein the optical wipes includes an exploded image.

13. The method defined in claim 9 wherein the optical wipes includes an imploded image.

14. The method defined in claim 9 wherein the optical wipes includes a variation in brilliance.

* * * * *